US012526765B2

(12) United States Patent
Ashraf et al.

(10) Patent No.: US 12,526,765 B2
(45) Date of Patent: Jan. 13, 2026

(54) MACHINE LEARNING MODEL VALIDATION FOR UE POSITIONING BASED ON REFERENCE DEVICE INFORMATION FOR WIRELESS NETWORKS

(71) Applicant: Nokia Technologies Oy, Espoo (FI)

(72) Inventors: Muhammad Ikram Ashraf, Espoo (FI); Teemu Mikael Veijalainen, Espoo (FI); Mikko Säily, Espoo (FI); Oana-Elena Barbu, Aalborg (DK); Taylan Sahin, Munich (DE); Afef Feki, Massy (FR); Athul Prasad, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 349 days.

(21) Appl. No.: 18/446,951

(22) Filed: Aug. 9, 2023

(65) Prior Publication Data
US 2024/0057022 A1 Feb. 15, 2024

Related U.S. Application Data

(60) Provisional application No. 63/371,211, filed on Aug. 11, 2022.

(51) Int. Cl.
*H04W 64/00* (2009.01)
*H04W 28/02* (2009.01)

(52) U.S. Cl.
CPC ..... *H04W 64/003* (2013.01); *H04W 28/0226* (2013.01); *H04W 28/0231* (2013.01)

(58) Field of Classification Search
CPC ........... H04W 64/003; H04W 28/0226; H04W 28/0231; H04W 64/00; G01S 5/0278; G01S 5/0218; G01S 5/0244; G06N 20/00
See application file for complete search history.

(56) References Cited

U.S. PATENT DOCUMENTS

2023/0232266 A1* 7/2023 Li .................. H04W 64/00
370/329
2023/0354254 A1* 11/2023 Sundararajan ........ G01S 5/0244
(Continued)

FOREIGN PATENT DOCUMENTS

WO 2022/058020 A1 3/2022
WO WO-2024027939 A1 * 2/2024 ........... G01S 5/0278

OTHER PUBLICATIONS

3GPP TSG RAN WG1 #109-e R1-2204838 e-Meeting Title: On potential specification impact of AI/ML for positioning, May 9-20, 2022 (Year: 2022).*

(Continued)

*Primary Examiner* — Nizar N Sivji
(74) *Attorney, Agent, or Firm* — Nokia Technologies Oy

(57) ABSTRACT

A method may include receiving, by a first user device from a network node or a second user device, 1) a positioning measurement report including at least one positioning measurement measured by a reference device, and 2) reference positioning-related information to be used for testing and/or validating a machine learning model; determining estimated positioning-related information as outputs of the machine learning model based on at least a portion of the positioning measurement report as inputs to the machine learning model; determining a performance indication of the machine learning model based on the reference positioning-related information and the estimated positioning-related information, wherein the performance indication indicates a performance or accuracy of the machine learning model; and performing, by the first user device, an action based on the performance indication.

20 Claims, 7 Drawing Sheets

(56) References Cited

U.S. PATENT DOCUMENTS

2024/0089905 A1* 3/2024 Gopalakrishnan ....... G06N 3/08
2024/0187877 A1* 6/2024 Esswie ................... G06N 20/00

OTHER PUBLICATIONS

3GPP TSG RAN WG1 #109-e R1-2205029 e-Meeting Title—Other aspects on AI-ML for positioning accuracy enhancement, May 9-20, 2022 (Year: 2022).*

"3rd Generation Partnership Project; Technical Specification Group Radio Access Network; NG-RAN; NR Positioning Protocol A (NRPPa) (Release 17", 3GPP TS 38.455, V17.1.1, Jun. 2022, pp. 1-198.

"3rd Generation Partnership Project; Technical Specification Group Radio Access Network; LTE Positioning Protocol (LPP) (Release 17)", 3GPP TS 37.355, V17.0.0, Mar. 2022, pp. 1-340.

"Revised WID on NR Positioning Enhancements", 3GPP TSG RAN Meeting #91e, RP-210897, Agenda: 9.7.25, Intel Corporation, Mar. 16-26, 2022, 6 pages.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Sub use cases and spec impacts for AI/ML for positioning accuracy enhancement", 3GPP TSG RAN WG1 #109-e, R1-2205081, Agenda: 9.2.4.2, Fujitsu, May 9-20, 2022, 2 pages.

"Discussion on AI/ML for positioning accuracy enhancement", 3GPP TSG RAN WG1 Meeting #109-e, R1-2203145, Agenda: 9.2.4.2, Huawei, May 9-20, 2022, 6 pages.

"Use-cases and specification for positioning", 3GPP TSG RAN WG1 #109-e, R1-2204798, Agenda: 9.2.4.2, Intel Corporation, May 9-20, 2022, pp. 1-21.

Sosnin et al., "NLOS Links Detection Algorithm for Improved 5G NR Indoor Positioning", IEEE International Black Sea Conference on Communications and Networking (BlackSeaCom), May 24-28, 2021, 6 pages.

Jiang et al., "UWB NLOS/LOS Classification Using Deep Learning Method", IEEE Communications Letters, vol. 24, No. 10, Oct. 2020, pp. 2226-2230.

"Msc-generator", Sourceforge, Retrieved on Sep. 7, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.2.0, Jun. 2022, pp. 1-228.

"Discussion summary #1 of [109-e-R18-AI/ML-08]", 3GPP TSG RAN WG1 Meeting #109-e, R1-2205229, Agenda: 9.2.4.2, vivo, May 9-20, 2022, pp. 1-54.

"Discussion on AI/ML for CSI feedback enhancement", 3GPP TSG RAN WG1 #109-e, R1-2203939, Agenda: 9.2.2.2, NEC, May 9-20, 2022, pp. 1-7.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.0.0, Mar. 2022, pp. 1-132.

Extended European Search Report received for corresponding European Patent Application No. 23180835.3, dated Jan. 4, 2024, 11 pages.

"Other aspects on AI-ML for positioning accuracy enhancement", 3GPP TSG RAN WG1 #109-e, R1-2205029, Agenda 9.2.4.1, Qualcomm Incorporated, May 9-20, 2022, pp. 1-16.

"On potential specification impact of AI/ML for positioning", 3GPP TSG RAN WGI #109-e, R1-2204838, Agenda 9.2.4.2, Fraunhofer IIS, May 9-20, 2022, 3 pages.

* cited by examiner

MACHINE LEARNING MODEL VALIDATION FOR UE POSITIONING BASED ON REFERENCE DEVICE INFORMATION FOR WIRELESS NETWORKS

RELATED APPLICATION

This application claims priority to U.S. Provisional Application No. 63/371,211, filed Aug. 11, 2022, and entitled "MACHINE LEARNING MODEL VALIDATION FOR UE POSITIONING BASED ON REFERENCE DEVICE INFORMATION FOR WIRELESS NETWORKS," which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3 rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include performing at least one of the following: receiving, by a first user device from a network node or a second user device, a request to test and/or validate a machine learning model for the first user device, wherein the machine learning model is to be used for positioning or to assist with positioning; or transmitting, by the first user device to the network node or the second user device, a request to validate the machine learning model; receiving, by the first user device from the network node or the second user device, 1) a positioning measurement report including at least one positioning measurement measured by a reference device based on reference signals, and 2) reference positioning-related information to be used for testing and/or validating the machine learning model; determining, by the first user device, estimated positioning-related information as outputs of the machine learning model based on at least a portion of the positioning measurement report as inputs to the machine learning model; determining, by the first user device, a performance indication of the machine learning model based on the reference positioning-related information and the estimated positioning-related information, wherein the performance indication indicates a performance or accuracy of the machine learning model; and performing, by the first user device, an action based on the performance indication.

According to an example embodiment, an apparatus may include: at least one processor; and at least one memory including computer program code; the at least one memory and the computer program code configured to, with the at least one processor, cause the apparatus at least to: perform at least one of the following: receive, by a first user device from a network node or a second user device, a request to test and/or validate a machine learning model for the first user device, wherein the machine learning model is to be used for positioning or to assist with positioning; or transmit, by the first user device to the network node or the second user device, a request to validate the machine learning model; receive, by the first user device from the network node or the second user device, 1) a positioning measurement report including at least one positioning measurement measured by a reference device based on reference signals, and 2) reference positioning-related information to be used for testing and/or validating the machine learning model; determine, by the first user device, estimated positioning-related information as outputs of the machine learning model based on at least a portion of the positioning measurement report as inputs to the machine learning model; determine, by the first user device, a performance indication of the machine learning model based on the reference positioning-related information and the estimated positioning-related information, wherein the performance indication indicates a performance or accuracy of the machine learning model; and perform, by the first user device, an action based on the performance indication.

According to an example embodiment, an apparatus may include: means for performing at least one of the following: receiving, by a first user device from a network node or a second user device, a request to test and/or validate a machine learning model for the first user device, wherein the machine learning model is to be used for positioning or to assist with positioning; or transmitting, by the first user device to the network node or the second user device, a request to validate the machine learning model; means for receiving, by the first user device from the network node or the second user device,
1) a\ positioning measurement report including at least one positioning measurement measured by a reference device based on reference signals, and
2) reference positioning-related information to be used for testing and/or validating the machine learning model; means for determining, by the first user device, estimated positioning-related information as outputs of the machine learning model based on at least a portion of the positioning measurement report as inputs to the machine learning model; means for determining, by the first user device, a performance indication of the machine learning model based on the reference positioning-related information and the estimated positioning-related information, wherein the performance indication indicates a performance or accuracy of the machine learning model; and means for performing, by the first user device, an action based on the performance indication.

According to an example embodiment, a non-transitory computer-readable storage medium may include instructions stored thereon that, when executed by at least one processor, are configured to cause a computing system to: perform at least one of the following: receive, by a first user device from a network node or a second user device, a request to test and/or validate a machine learning model for the first user device, wherein the machine learning model is to be used for positioning or to assist with positioning; or transmit, by the first user device to the network node or the second user device, a request to validate the machine learning model; receive, by the first user device from the network node or the second user device, 1) a positioning measurement report including at least one positioning measurement measured by a reference device based on reference signals, and 2) reference positioning-related information to be used for testing and/or validating the machine learning model; determine, by the first user device, estimated positioning-related information as outputs of the machine learning model based on at least a portion of the positioning measurement report as inputs to the machine learning model; determine, by the first user device, a performance indication of the machine learning model based on the reference positioning-related information and the estimated positioning-related information, wherein the performance indication indicates a performance or accuracy of the machine learning model; and perform, by the first user device, an action based on the performance indication.

According to an example embodiment, a method may include performing at least one of the following by a network node or a second user device: transmitting, by a network node or a second user device to a first user device, a request to test and/or validate a machine learning model for the first user device, wherein the machine learning model is to be used for positioning or to assist with positioning; or receiving, by the network node or the second user device from the first user device, a request to validate the machine learning model; receiving by the network device or the second user device from a reference device, 1) a positioning measurement report including at least one positioning measurement measured by a reference device based on reference signals, and 2) reference positioning-related information to be used for testing and/or validating the machine learning model; transmitting, by the network node or the second user device to the first user device, the positioning measurement report; receiving, by the network node or the second user device from the first user device, estimated positioning-related information, which are outputs of the machine learning model of the first user device based on at least a portion of the positioning measurement report as inputs to the machine learning model of the first user device; determining, by the network node or the second user device, a performance indication of the machine learning model based on the reference positioning-related information and the estimated positioning-related information, wherein the performance indication indicates a performance or accuracy of the machine learning model; and, performing, by the network node or the second user device, an action based on the performance indication.

According to an example embodiment, an apparatus may include: at least one processor; and at least one memory including computer program code; the at least one memory and the computer program code configured to, with the at least one processor, cause the apparatus at least to: perform at least one of the following by a network node or a second user device: transmit, by a network node or a second user device to a first user device, a request to test and/or validate a machine learning model for the first user device, wherein the machine learning model is to be used for positioning or to assist with positioning; or receive, by the network node or the second user device from the first user device, a request to validate the machine learning model; receive by the network device or the second user device from a reference device, 1) a positioning measurement report including at least one positioning measurement measured by a reference device based on reference signals, and 2) reference positioning-related information to be used for testing and/or validating the machine learning model; transmit, by the network node or the second user device to the first user device, the positioning measurement report; receive, by the network node or the second user device from the first user device, estimated positioning-related information, which are outputs of the machine learning model of the first user device based on at least a portion of the positioning measurement report as inputs to the machine learning model of the first user device; determine, by the network node or the second user device, a performance indication of the machine learning model based on the reference positioning-related information and the estimated positioning-related information, wherein the performance indication indicates a performance or accuracy of the machine learning model; perform, by the network node or the second user device, an action based on the performance indication.

According to an example embodiment, an apparatus may include means for performing at least one of the following by a network node or a second user device: transmitting, by a network node or a second user device to a first user device, a request to test and/or validate a machine learning model for the first user device, wherein the machine learning model is to be used for positioning or to assist with positioning; or receiving, by the network node or the second user device from the first user device, a request to validate the machine learning model; means for receiving by the network device or the second user device from a reference device, 1) a positioning measurement report including at least one positioning measurement measured by a reference device based on reference signals, and 2) reference positioning-related information to be used for testing and/or validating the machine learning model; means for transmitting, by the network node or the second user device to the first user device, the positioning measurement report; means for receiving, by the network node or the second user device from the first user device, estimated positioning-related information, which are outputs of the machine learning model of the first user device based on at least a portion of the positioning measurement report as inputs to the machine learning model of the first user device; means for determining, by the network node or the second user device, a performance indication of the machine learning model based on the reference positioning-related information and the estimated positioning-related information, wherein the performance indication indicates a performance or accuracy of the machine learning model; and, means for performing, by the network node or the second user device, an action based on the performance indication.

According to an example embodiment, a non-transitory computer-readable storage medium may include instructions stored thereon that, when executed by at least one processor, are configured to cause a computing system to: perform at least one of the following by a network node or a second user device: transmit, by a network node or a second user device to a first user device, a request to test and/or validate a machine learning model for the first user device, wherein the machine learning model is to be used for positioning or to assist with positioning; or receive, by the network node or the second user device from the first user device, a request to validate the machine learning model; receive by the network device or the second user device from a reference device, 1) a positioning measurement report including at least one positioning measurement measured by a reference device based on reference signals, and 2) reference positioning-related information to be used for testing and/or validating the machine learning model; transmit, by the network node or the second user device to the first user device, the positioning measurement report; receive, by the network node or the second user device from the first user device, estimated positioning-related information, which are outputs of the machine learning model of the first user device based on at least a portion of the positioning measurement report as inputs to the machine learning model of the first user device; determine, by the network node or the second user device, a performance indication of the machine learning model based on the reference positioning-related information and the estimated positioning-related information, wherein the performance indication indicates a performance or accuracy of the machine learning model; perform, by the network node or the second user device, an action based on the performance indication.

The details of one or more examples of embodiments are set forth in the accompanying drawings and the description below. Other features will be apparent from the description and drawings, and from the claims.

DETAILED DESCRIPTION

Figure 1:
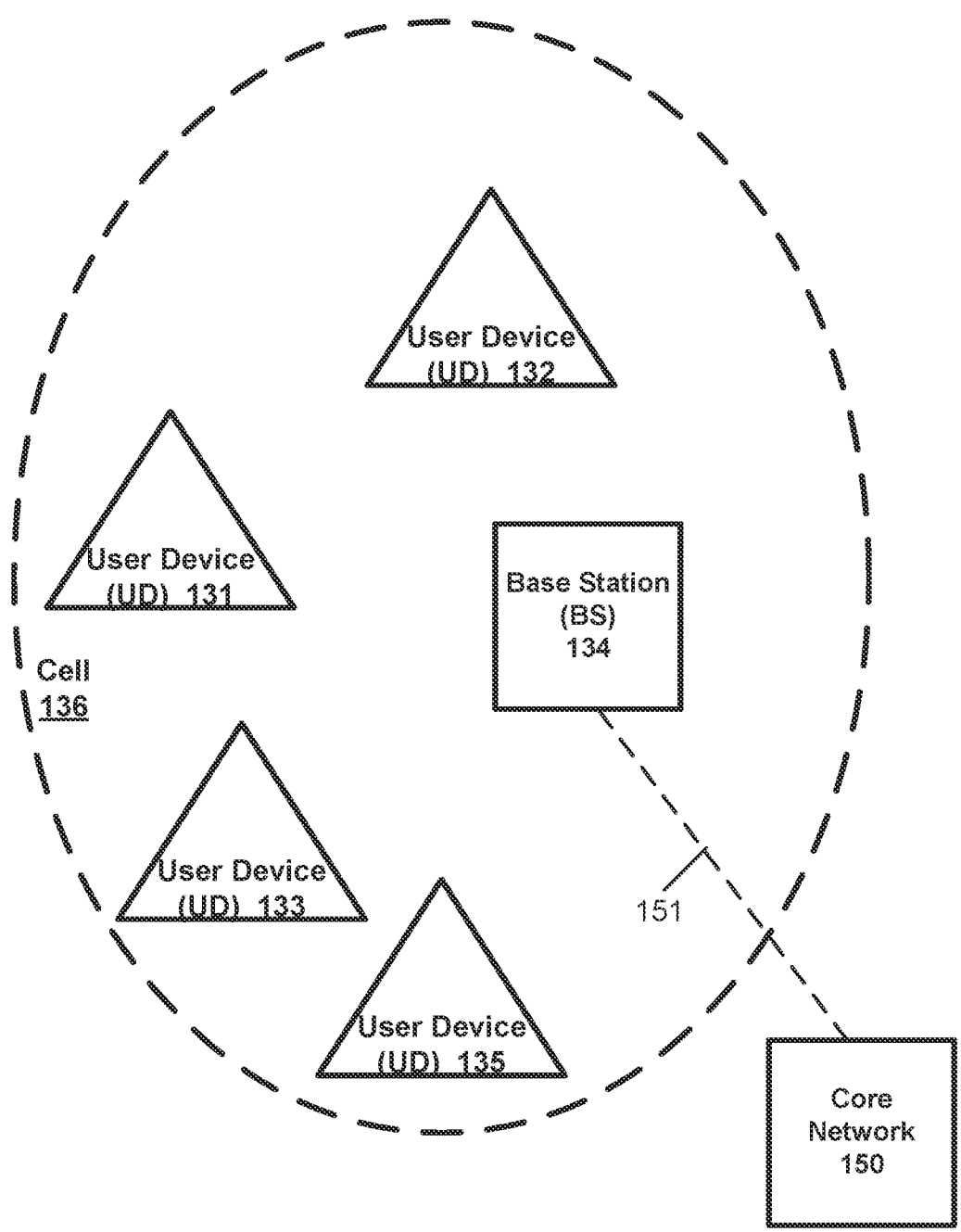
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS (or network node) may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used. A wireless node may include, e.g., a BS, a gNB, an eNB, an AP, a RAN node, a CU and/or DU (or other network node), a relay node, a user device, a UE, or other node that has wireless communication capabilities, etc.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node or other network node (e.g., BS, eNB, gNB, CU/DU, transmission reception point (TRP), . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, 6G, IoT, MTC, eMTC, eMBB, URLLC, etc., or any other wireless network or wireless technology. These example networks, technologies or data service types are provided only as illustrative examples.

According to an example embodiment, a machine learning (ML) model may be used within a wireless network to perform (or assist with performing) one or more tasks. In general, one or more nodes (e.g., BS, gNB, eNB, RAN node, user node, UE, user device, relay node, or other wireless node) within a wireless network may use or employ a ML model, e.g., such as, for example a neural network model (e.g., which may be referred to as a neural network, an artificial intelligence (AI) neural network, an AI neural network model, an AI model, a machine learning (ML) model or algorithm, a model, or other term) to perform, or assist in performing, one or tasks or operations.

ML-based algorithms or ML models may be used to perform and/or assist with performing a variety of wireless and/or radio resource management (RRM) functions or tasks to improve network performance, such as, e.g., positioning of a UE or other device (positioning estimation), beam control, RRM measurements and feedback (channel state information (CSI) feedback), link monitoring, Transmit Power Control (TPC), etc.

Models (e.g., neural networks or ML models) may be or may include, for example, computational models used in machine learning made up of nodes organized in layers. The nodes are also referred to as artificial neurons, or simply neurons, and perform a function on provided input to produce some output value. A neural network or ML model may typically require a training period to learn the parameters, i.e., weights, used to map the input to a desired output. The mapping occurs via the function. Thus, the weights are weights for the mapping function of the neural network. Each neural network model or ML model may be trained for a particular task.

To provide the output given the input, the neural network model or ML model should be trained, which may involve learning the proper value for a large number of parameters (e.g., weights) for the mapping function. The parameters are also commonly referred to as weights as they are used to weight terms in the mapping function. This training may be an iterative process, with the values of the weights being tweaked over many (e.g., thousands) of rounds of training until arriving at the optimal, or most accurate, values (or weights). In the context of neural networks (neural network models) or ML models, the parameters may be initialized, often with random values, and a training optimizer iteratively updates the parameters (weights) of the neural network to minimize error in the mapping function. In other words, during each round, or step, of iterative training the network updates the values of the parameters so that the values of the parameters eventually converge to the optimal values.

Neural network models or ML models may be trained in either a supervised or unsupervised manner, as examples. In supervised learning, training examples are provided to the neural network model or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the neural network model learns to identify a structure or pattern in the provided input. In other words, the model identifies implicit relationships in the data. Unsupervised learning is used in many machine learning problems and typically requires a large set of unlabeled data.

According to an example embodiment, the learning or training of a ML model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also may optimize its choice of objects for which to acquire labels. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there may be no specific way to compare model performance in most unsupervised learning methods.

In some cases, a UE positioning session (or positioning procedure) may be used to determine a location or geographic position of a UE (or mobile device). For example, a Location Management Function (LMF) may be a network entity that may request and/or coordinate a positioning session to determine (or obtain) a position of one or more UEs. In some examples, UE positioning may be performed or determined based on positioning reference signals (PRSs), sounding reference signals (SRSs), or other reference signals. Positioning reference signals may include any signals that may be used to determine or estimate a position of a user equipment, node or object. Downlink positioning reference signals (PRSs) and uplink (UL) sounding reference signals (SRSs) are examples of positioning reference signals, and other reference signals or positioning reference signals may be used. A UE or other device or node may determine or calculate a positioning measurement based on received reference signals. Some example positioning measurements may include, e.g., reference signal received power (RSRP), angle of arrival (AOA), time of arrival, phase, Time Difference of Arrival (TDOA), such as downlink-TDOA (DL-TDOA), DL (downlink) Angle of Departure (DL-AoD), multi-round trip time (multi-RTT) positioning, or other positioning measurements or positioning techniques. Depending on the technique used for positioning, one or more of these positioning measurements may be required to calculate a position estimate of a target UE (the UE to be positioned). Other positioning-related information may be determined as well for a UE or device based on the received reference signals, such as a line of sight/non-line of sight (LOS/N LOS) status of the UE (e.g., which may indicate whether the link between the UE and network node is LOS or NLOS).

For example, some PRSs may be or may include PRS sequences that may be pseudo-random sequences that have good (or relatively high) auto-correlation properties and small (or relatively low) cross-correlation properties, e.g., to allow timing or time differences of two signals to be determined. In the case of uplink/downlink (UL/DL) positioning (where PRS signals are communicated between a UE and a network node or gNB), PRS signals may include downlink (DL) PRS signals (transmitted by a gNB or other network node to a UE), or uplink (UL) PRS signals (transmitted by a UE to a gNB or network node).

Sidelink (SL) communications (which may also be referred to as device-to-device communications, or UE-to-UE communications) are communications directly between UEs (or directly between user devices or user nodes), e.g., without necessarily using or going through a network node (gNB or BS). A UE may obtain SL resources for a SL channel, to perform SL communications with one or more other nearby UEs. A UE may be involved in both traditional UE-gNB communications, and SL communications. Thus, a UE may have, for example, a UE-gNB radio link established for communication with a gNB or network node, and the UE may be part of SL group in which the UE may transmit and/or receive signals or information via SL resources of a SL channel with other member UEs of the SL group, for example.

In a case of sidelink (SL) positioning, PRS signals may include sidelink positioning reference signals (SL PRSs), which may include reference signals transmitted by a UE and/or received by a UE via a sidelink channel (e.g., sidelink resources that may be used for direct UE-to-UE communication) that may be used to obtain positioning measurements and/or position a UE or other object. In SL positioning, one or more UEs transmit SL PRSs to one or more other UEs, to allow a positioning measurement(s) to be determined by the receiving UEs and/or to allow a position estimate of a UE to be calculated (e.g., based on one or more positioning measurements). In SL positioning, one or more UEs (that are participating in the positioning session) may determine a positioning measurement(s) (based on received SL PRSs), such as amplitude or reference signal received power (RSRP), angle of arrival, time of arrival, phase, or other positioning measurement. Depending on the technique used for SL positioning, one or more of these positioning measurements may be required to calculate a position estimate of a target UE (the UE to be positioned). Sidelink (SL) positioning may be performed using different or various positioning methods or based on various positioning measurements, such as, e.g., Time Difference of Arrival (TDOA), Angle of Departure (AoD), multi-round trip time (multi-RTT) positioning, Angle of Arrival (AOA), or other positioning techniques or positioning measurements.

In some cases, a reference device, such as a positioning reference unit (PRU) may be used to perform or assist in performing UE positioning. A PRU may be or may include, for example, a UE or other node device that may have one or more known characteristics (e.g., a known position and/or known LOS/N LOS classification, and/or a known positioning measurement based on certain reference signals), which may perform positioning measurement(s) based on reference signals. According to an example embodiment, in some cases, these positioning measurements (e.g., AOA, TDOA, RSRP, LOS/NLOS status or classification) by the PRU may be used as a reference based on the known position and/or LOS/NLOS classification of the PRU (or other known characteristic of the PRU). Reference devices may also include or refer to any device within the network that has a trust (or trusted) ML model deployed. A trusted ML model may imply or may include or mean that the ML model performance in terms of positioning accuracy or other intermediate features (e.g., that may be part of positioning) is within acceptable limits or required performance or accuracy.

Some research has been directed to exploring benefits of augmenting or enhancing UE and/or network performance with AI or machine learning (ML) models. As noted, one of the use cases for ML models is positioning accuracy enhancements. For example, according to an example embodiment, ML models may be used, at least in some cases, to improve LOS/NLOS status or classifications for UEs and/or to assist with UE positioning estimates, e.g., to improve positioning accuracy.

Figure 2:
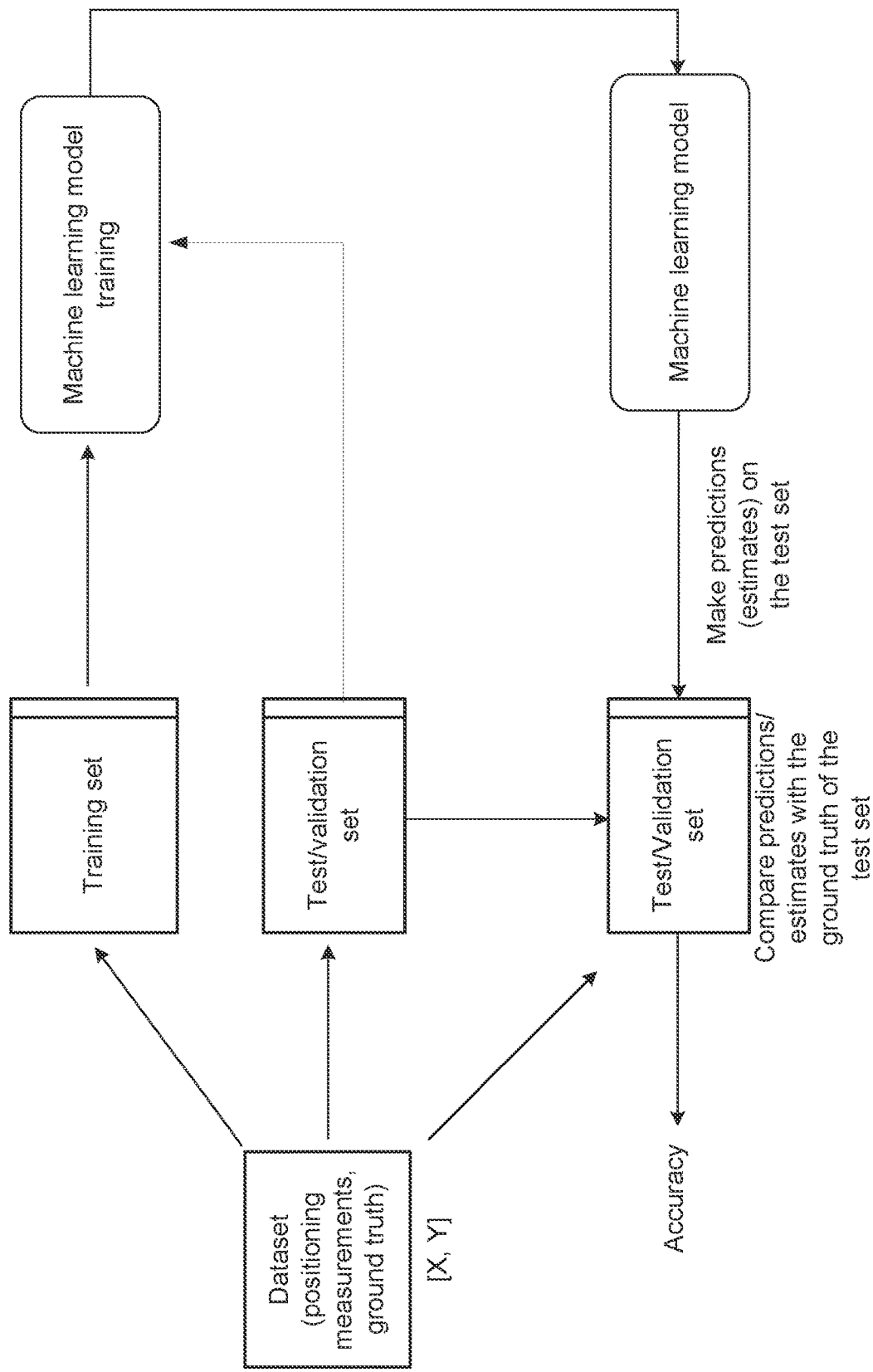
FIG. 2 is a diagram illustrating testing and validation of a machine learning model according to an example embodiment.

FIG. 2 is a diagram illustrating testing and validation of a machine learning model according to an example embodiment. This invention relates to validation of positioning ML model. Thus, the FIG. 1 below describes an example process of testing and validation of ML models. For example, the training data set may be split to non-overlapping training, test, and validation data sets (at least in this example). As the name describes, training data set is used for training of the ML model, e.g., in which ML model weights and other parameters of the ML model may be set or adjusted. Validation data used during model training may be used to evaluate the accuracy of the ML model training, while a test data may, for example, be used after model training to estimate its accuracy or to obtain accuracy of the model after the training. Testing of a ML model may include or may refer to providing the test data to the ML model for inference, and calculating the error between the predicted outputs of the ML model and the ground truth labels of the output parameter. The ML model testing may be done to verify the accuracy of the predictions made by the ML model, and is done after model training. Validating a ML model may include or may refer to evaluating the accuracy of a ML model before the training process is complete. ML model validation may be conducted using a validation dataset that is (or may be) different from the training dataset. However, the outcome of the validation process is (or may be) used to update the ML model, and hence may be considered part of the ML model training process. For example, a ML model may be described as a function with parameters w, input X, and output $\hat{Y}$ i.e., $f(X|w)=\hat{Y}$. One example of validation may be or may include, taking the validation data-set, i.e., ($X^{validation}$, $Y^{validation}$) and comparing the ML model or neural network output with the validation labels i.e., $L=(f(X^{validation}|w)-Y^{validation})^2$. Ground truth, and/or the labels, may refer to or may include the true or accurate information that may be estimated or output by the ML model. For example, the ground truth or the labels may refer to or may include the true or accurate position of the UE or PRU, or the true or accurate LOS/N LOS status or classification of the UE or PRU, e.g., in the case of a ML model that is used for positioning of the UE or PRU.

In some cases, the performance or accuracy of a UE ML model (e.g., for positioning estimation, LOS/N LOS classification estimation, or other ML model) may change or decrease over time, e.g., as the position of the UE changes, for example. Therefore, to ensure that a ML model is generating or outputting sufficiently accurate results (e.g., outputting sufficiently accurate positioning estimates or LOS/N LOS classification estimates), it may be necessary to periodically test and/or validate the ML model against labelled data or ground truth (e.g., compare the outputs of the ML model to an actual or true position (an accurate or true positioning estimate) or accurate or true LOS/NLOS classification(s), based on one or more positioning measurements, e.g., in order to increase the confidence in the model output. The "labels" may be de facto trusted and thus are considered to be the ground truth, for example. Labels are or may be ground truth/accurate values used to compare and validate the positioning estimation obtained as outputs of a ML model.

In some cases, it may be expected that the UE vendors would not disclose/expose the details of their ML model for positioning purposes deployed at the UE, which could be a part of their proprietary algorithm (e.g., black box). Thus, the network may not have any knowledge about the UE-based ML model, including its accuracy or performance in terms of positioning. However, the network may want to validate or test the performance of the ML model used by the UE, in order to determine how reliable the UE-based positioning estimates are, e.g., so as to respond to a positioning service request.

Also, for example, the UE might encounter a new environment that has significantly different characteristics from the environment where the ML model was trained (e.g., thus, rendering the settings of the ML model inaccurate in the new environment). In such situation, the network may want to validate or test the performance of its ML model before employing it for real-time inference (e.g., for real-time positioning of UEs). However, currently there are no mechanisms for the UE or NW to validate/test a ML model deployed at the UE side for a given setting.

Figure 3:
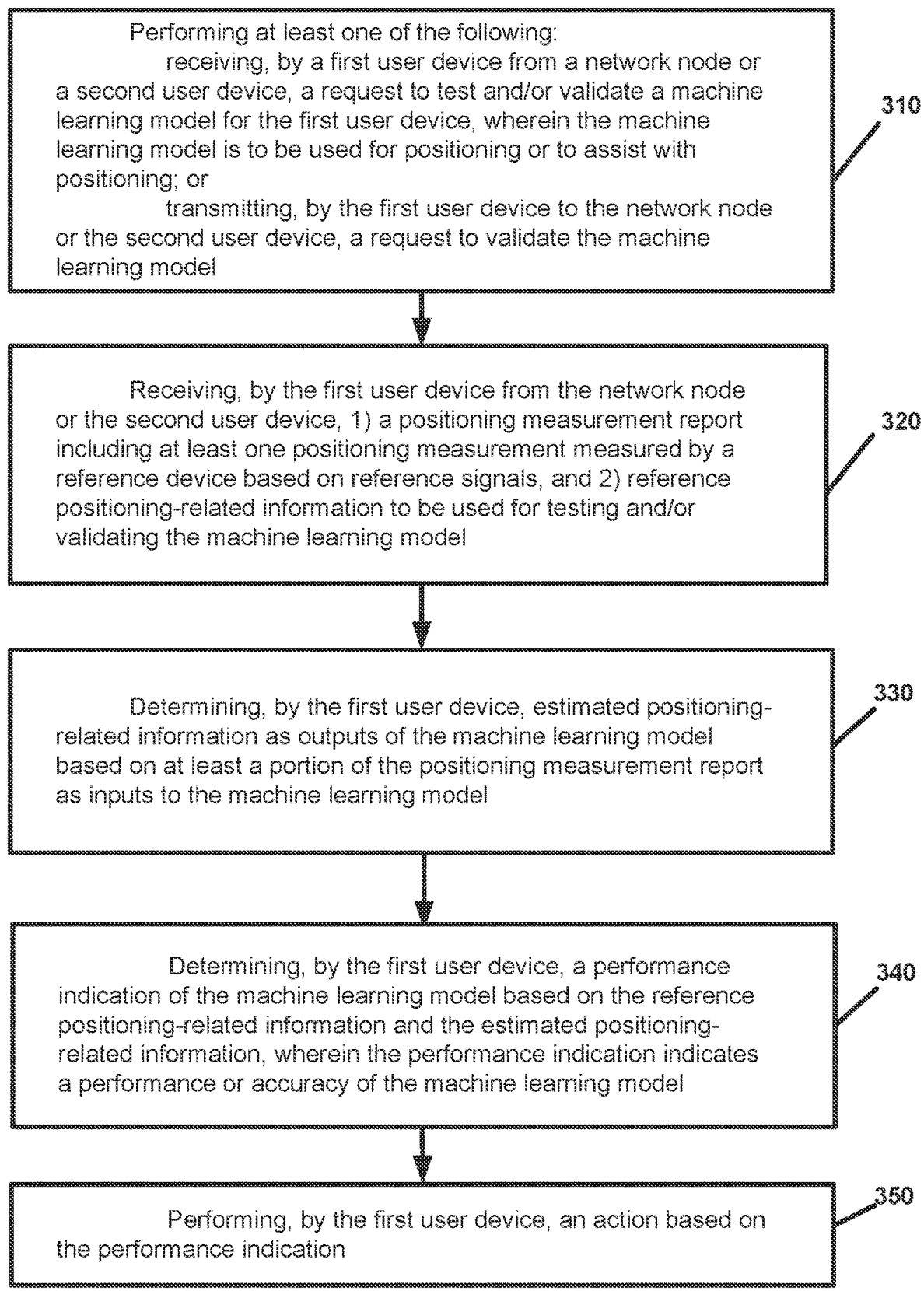
FIG. 3 is a flow chart illustrating operation of a user equipment or user device according to an example embodiment.

FIG. 3 is a flow chart illustrating operation of a user equipment or user device according to an example embodiment. Referring to FIG. 3, operation 310 includes performing at least one of the following: receiving, by a first user device from a network node or a second user device, a request to test and/or validate a machine learning model for the first user device, wherein the machine learning model is to be used for positioning or to assist with positioning; or transmitting, by the first user device to the network node or the second user device, a request to validate the machine learning model. Operation 320 includes receiving, by the first user device from the network node or the second user device, 1) a positioning measurement report including at least one positioning measurement (e.g., AOA, TDOA, RSRP) measured by a reference device (e.g., by a PRU or trusted device) based on reference signals, and 2) reference positioning-related information (e.g., ground truth, such as a true or accurate position of a device (such as a true or accurate location of a PRU or reference device), and/or true or accurate LOS/N LOS status of the device or PRU) to be used for testing and/or validating the machine learning model. Operation 330 includes determining, by the first user device, estimated positioning-related information (e.g., an estimated position or estimated LOS/N LOS status or classification output by the ML model, based on information of the measurement report input to the ML model) as outputs of the machine learning model based on at least a portion of the positioning measurement report as inputs to the machine learning model. Operation 340 includes determining, by the first user device, a performance indication (e.g., a key performance indicator, or an indication of the performance or accuracy of the ML model) of the machine learning model based on the reference positioning-related information and the estimated positioning-related information, wherein the performance indication indicates a performance or accuracy of the machine learning model. And, operation 350 includes performing, by the first user device, an action based on the performance indication.

According to an example embodiment of the method of FIG. 3, the performing an action based on the performance indication may include making one or more changes to the machine learning model based on the performance indication.

According to an example embodiment of the method of FIG. 3, the performing an action based on the performance indication may include transmitting, by the first user device to the network node or the second user device, the performance indication. The performance indication may always be transmitted, or it may be conditionally transmitted. For example, the transmitting the performance indication may include at least one of the following: transmitting the performance indication if the performance indication is greater than a first threshold; or transmitting the performance indication if the performance indication is less than a second threshold. For example, the UE may determine that the performance indication is greater than the first threshold and based on this determination, the UE may transmit the performance indication. Also, for example, the UE may determine that the performance indication is less than the second threshold, and based on this determination, the UE may transmit the performance indication. In an example, the UE may determine that the performance indication is less than or equal to the first threshold and greater than or equal to the second threshold and based on this determining to refrain from transmitting the performance indication. In this case, the UE may determine that the model is working according to given performance requirements. It is further noted that in some example embodiments, the determination whether to transmit performance indication may be based on the performance indication comparison with one or more thresholds or one or more conditions, but the transmitted performance indication of ML model performance may be different than the one used for the comparison. For example, in a reported performance indication, it may be possible that the UE simply indicates (e.g., a flag or similar indication) that the model is working or is not working according to the performance requirements or required accuracy. Thus, for example, the UE may transmit a performance indication which may simply indicate whether the ML model is performing according to the required performance (e.g., required accuracy) requirements, e.g., as a flag or other indicator.

According to an example embodiment of the method of FIG. 3, the reference positioning-related information may include at least one of: a true or accurate line-of-sight/non-line-of-sight (LOS/N LOS) status of the reference device; a true or accurate position of the reference device; ground truth; or a predicted output of the machine learning model based on at least the portion of the positioning measurement report as inputs to the machine learning model if (or assuming that) the machine learning model is operating within a threshold level of accuracy (e.g., the reference positioning-related information may include a predicted output of the ML mode based on (or assuming) the ML model is accurate or performs within a threshold level of accuracy).

According to an example embodiment of the method of FIG. 3, the estimated positioning-related information may include at least one of: an estimated line-of-sight/non-line-of-sight (LOS/NLOS) status of the reference device, based on at least the portion of the positioning measurement report as inputs to the machine learning model; and/or an estimated position of the reference device, based on at least the portion of the positioning measurement report as inputs to the machine learning model.

According to an example embodiment of the method of FIG. 3, the performance indication of the machine learning model may be based on a comparison between the reference positioning-related information and the estimated positioning-related information. Or, the performance indication of the machine learning model may include, or may be based upon, at least one of the following: a difference between the reference positioning-related information and the estimated positioning-related information; or an error estimation between the reference positioning-related information and the estimated positioning-related information.

According to an example embodiment of the method of FIG. 3, the performing an action based on the performance indication may include: transmitting, by the first user device to the network node or the second user device, the performance indication; wherein the method further may further include: receiving, by the first user device from the network node or the second user device, machine learning model change information based on the transmitted performance indication, to cause the first user device to perform one or more changes with respect to the machine learning model. According to an example embodiment of the method of FIG. 3, the machine learning model change information may include one or more of the following: an indication that the machine learning model is inaccurate or does not meet a performance requirement; information to trigger a deactivation and/or a reselection of the machine learning model; a request to perform one or more changes or updates to the machine learning model; a request to re-train the machine learning model; a request to use a positioning method that does not use a machine learning model; or a request to replace the machine learning model with a different machine learning model.

According to an example embodiment of the method of FIG. 3, the one or more changes performed by the first user device with respect to the machine learning model may include one or more of the following: perform one or more changes or updates to the machine learning model; retrain the machine learning model; deactivate the machine learning model; select a different machine learning model; activate a different or new machine learning model, or replace the machine learning model with a different machine learning model; and/or use a positioning method that does not use a machine learning model.

According to an example embodiment of the method of FIG. 3, the performing an action based on the performance indication may include performing one or more of the following: performing one or more changes or updates to the machine learning model; retraining the machine learning model; deactivating the machine learning model; selecting a different machine learning model; activating a different or new machine learning model, or replacing the machine learning model with a different machine learning model; using a positioning method that does not use a machine learning model.

According to an example embodiment of the method of FIG. 3, the reference device may include at least one of: a third user device that operates as a positioning reference unit (PRU); a third user device that is at a known location, has a known LOS/N LOS status, and/or has one or more known positioning measurements; or a device that is trusted by the network node or trusted by one or more entities of a wireless network.

According to an example embodiment of the method of FIG. 3, the network node may include at least one of: a base station, eNB or gNB, or a location management function (LMF).

According to an example embodiment of the method of FIG. 3, the method may further include transmitting, by the user device to the network node or second user device, information indicating one or more inputs of the machine learning model; wherein the received positioning measurement report is based on, or includes information that is based on, the information indicating one or more inputs of the machine learning model (e.g., the measurement report sent to the first user device may be based on, or may include information or inputs, that are based on inputs of the ML model).

Figure 4:
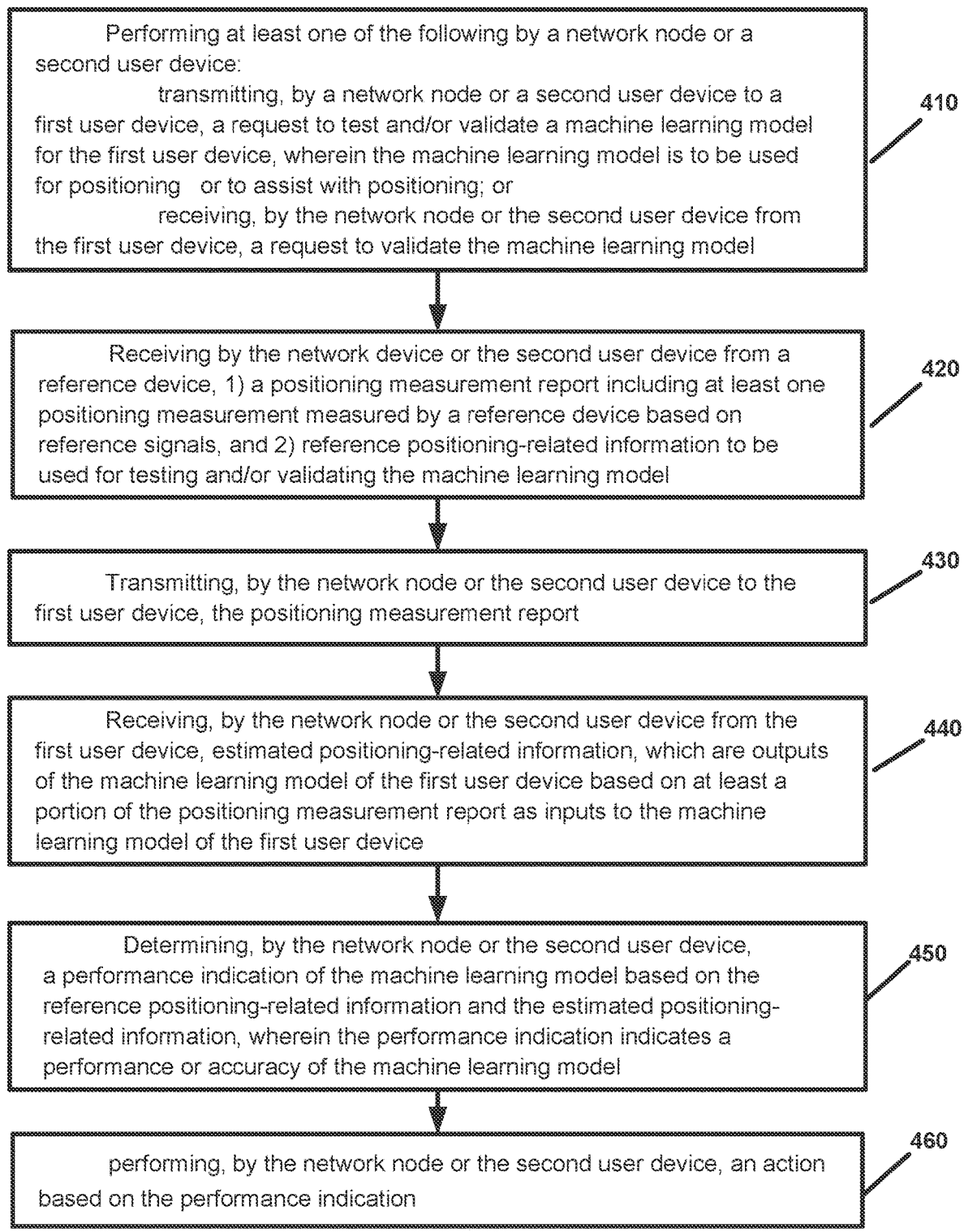
FIG. 4 is a flow chart illustrating operation of a network node or user device according to an example embodiment.

FIG. 4 is a flow chart illustrating operation of a network node or user device according to an example embodiment. Operation 410 includes performing at least one of the following by a network node or a second user device: transmitting, by a network node or a second user device to a first user device, a request to test and/or validate a machine learning model for the first user device, wherein the machine learning model is to be used for positioning or to assist with positioning; or receiving, by the network node or the second user device from the first user device, a request to validate the machine learning model. Operation 420 includes receiving by the network device or the second user device from a reference device (e.g., PRU or trusted device), 1) a positioning measurement report including at least one positioning measurement measured by a reference device based on reference signals, and 2) reference positioning-related information to be used for testing and/or validating the machine learning model. Operation 430 includes transmitting, by the network node or the second user device to the first user device, the positioning measurement report. Operation 440 includes receiving, by the network node or the second user device from the first user device, estimated positioning-related information, which are outputs of the machine learning model of the first user device based on at least a portion of the positioning measurement report as inputs to the machine learning model of the first user device. Operation 450 includes determining, by the network node or the second user device, a performance indication of the machine learning model based on the reference positioning-related information and the estimated positioning-related information, wherein the performance indication indicates a performance or accuracy of the machine learning model. And, operation 460 includes performing, by the network node or the second user device, an action based on the performance indication.

According to an example embodiment of the method of FIG. 4, the performing an action may include: determining machine learning model change information based on the performance indication; and transmitting, by the network node or second user device to the first user device, the machine learning model change information to cause the first user device to perform one or more changes with respect to the machine learning model. For example, the machine learning model change information may include one or more of the following: an indication that the machine learning model is inaccurate or does not meet a performance requirement; information to trigger a deactivation and/or a reselection of the machine learning model; a request to perform one or more changes or updates to the machine learning model; a request to re-train the machine learning model; a request to use a positioning method that does not use a machine learning model; or a request to replace the machine learning model with a different machine learning model.

According to an example embodiment of the method of FIG. 4, the reference positioning-related information may include at least one of: a true or accurate line-of-sight/non-line-of-sight (LOS/N LOS) status of the reference device; a true or accurate position of the reference device; or a predicted output of the machine learning model, based on at least the portion of the positioning measurement report as inputs to the machine learning model, if the machine learning model is operating accurately or within a threshold level of accuracy; and/or ground truth.

According to an example embodiment of the method of FIG. 4, the estimated positioning-related information may include at least one of: an estimated line-of-sight/non-line-of-sight (LOS/NLOS) status of the reference device, based on at least the portion of the positioning measurement report as inputs to the machine learning model; an estimated position of the reference device, based on at least the portion of the positioning measurement report as inputs to the machine learning model.

According to an example embodiment of the method of FIG. 4, the performance indication of the machine learning model may be based on a comparison between the reference positioning-related information and the estimated positioning-related information. Or, for example, the performance indication of the machine learning model may include, or is based upon, at least one of the following: a difference between the reference positioning-related information and the estimated positioning-related information; or an error estimation between the reference positioning-related information and the estimated positioning-related information.

Figure 5:
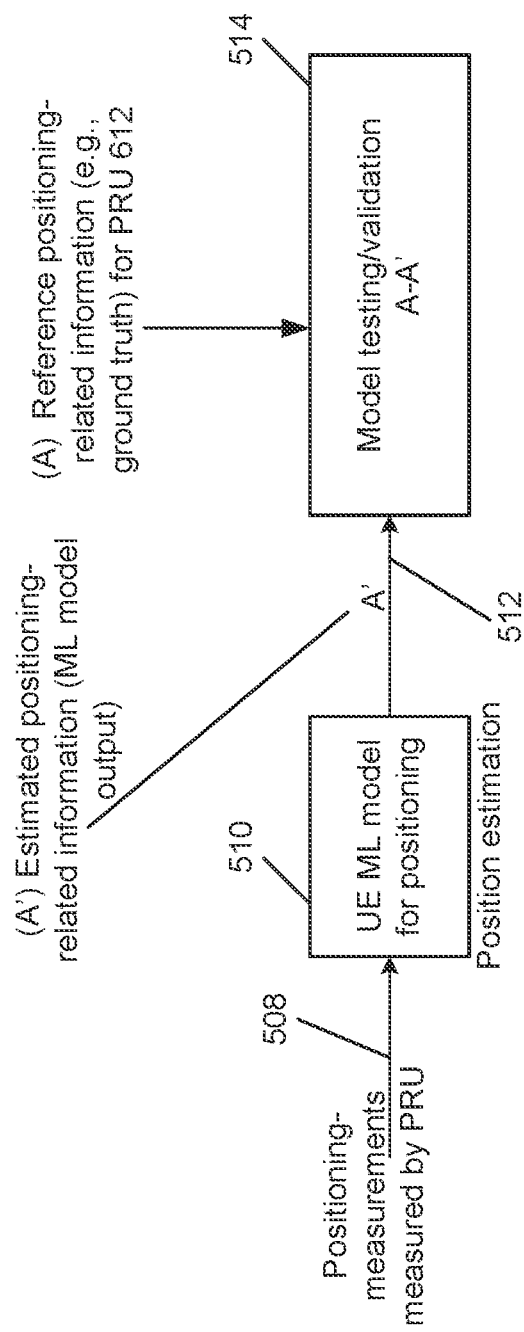
FIG. 5 is a diagram illustrating testing and/or validation of a machine learning model according to an example embodiment.
Figure 6:
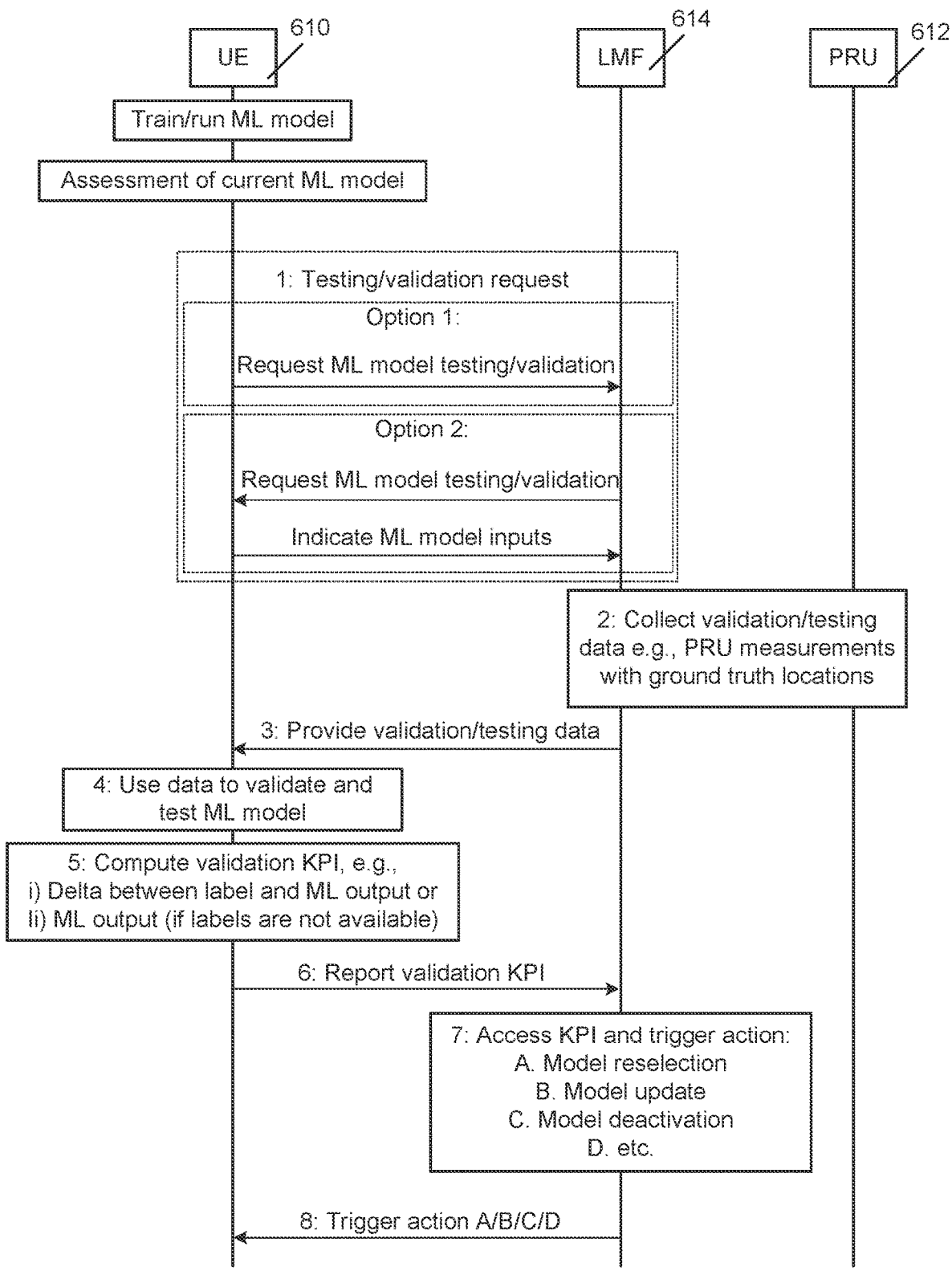
FIG. 6 is a diagram illustrating operation of a network according to an example embodiment.

FIG. 5 is a diagram illustrating testing and/or validation of a machine learning model according to an example embodiment. FIG. 6 is a diagram illustrating operation of a network according to an example embodiment. A UE 610 (FIG. 6) may be in communication with a location management function (LMF) 614 and a positioning device such as a PRU 612. The LMF 614 may request and/or may coordinate positioning of UE 610 and/or other devices.

With respect to FIGS. 5 and 6, UE 610 may train a ML model 510 for positioning (or to assist with positioning). An assessment may be performed by the UE 610 of the ML model 510, and UE may determine that it may be desirable to test and/or validate such ML model 510. At step 1 (option 1) of FIG. 6, the UE 610 may send a request to LMF 614 for the UE 610 to test and/or validate the UE ML model 510, including an indication of ML model inputs (e.g., TDOA measurements, RSRP measurements, TRP/cell identities, UE mobility characteristics, or other ML model inputs) of the UE ML model 510 used for positioning, for example. Or at option 2 of step 1, the UE 610 may receive a request from LMF 614 that requests testing and/or validation (and/or requests the UE to test/validate) the UE ML model 510. UE 610 may transmit or provide LMF 614 with an indication of the UE ML model inputs (e.g., so that test data or test positioning measurements provided by the LMF 614 or network node to UE 610 to test the accuracy of the UE ML model 510 may be provided that matches the inputs used by the UE ML model 510). For example, UE 610 may indicate to LMF 614 that its positioning ML model 510 uses TDOA measurements and RSRP measurements (e.g., merely as an illustrative example of some ML model inputs) of a device to estimate (e.g., as outputs of its ML model 510) a position or location and LOS/NLOS status of the device or UE.

At step 2 of FIG. 6, the LMF 614 may determine whether it has sufficient test/validation data, and if not, LMF 614 or network node may (request and) collect (or receive) from one or more PRUs or other trusted devices (such as PRU 612) validation/testing data, which may include a PRU measurement report (which may include PRU measurements or positioning measurements measured by the PRU 612) and ground truth for the PRU(s). Some example positioning measurements (or PRU measurements in this example) may include, e.g., reference signal received power (RSRP), angle of arrival (AOA), time of arrival, phase, Time Difference of Arrival (TDOA), such as downlink-TDOA (DL-TDOA), DL (downlink) Angle of Departure (DL-AoD), or other positioning measurements. The ground truth (or reference positioning-related information) for the PRU 612 may include reference location and/or reference LOS/NLOS status, such as actual or true position or location (e.g., actual or true GPS coordinates or latitude/longitude) of the PRU 612, e.g., since the PRU position and LOS/NLOS status of the PRU may be known by the PRU 612 and possibly known by other nodes and/or known by the LMF 614.

At step 3 of FIG. 6, the UE 610 may receive the validation and/or testing data that may be used to test and/or validate the UE ML model 510. The validation and/or testing data may include: 1) a positioning measurement report(s), which may include one or more positioning measurements measured by PRU 612, and 2) associated ground truth (labels) or reference positioning-related information (e.g., such as an actual or true position of the PRU 612 and/or actual or true LOS/NLOS status of PRU 612). Note that the positioning measurements provided by LMF 614 (measured by PRU 612) may match (at least in part) the type of UE ML model inputs used by UE ML model 510 (e.g., so that test/validation data or test positioning measurements provided by the LMF 614 or network node to UE 610 may be used to test the accuracy of the UE ML model 510). Thus, if UE 610 indicates that its UE positioning ML model 510 uses TDOA measurements and RSRP measurements as ML model inputs, the validation/testing data provided by LMF 614 to UE 610 may include, e.g., one or more or both of TDOA measurements and/or RSRP measurements, for example.

At step 4 of FIG. 6, the UE 610 may test and/or validate the UE ML model 510 that is used for positioning, e.g., to determine or calculate the prediction accuracy of the ML model 510 to determine or estimate positioning-related information such as UE or device position and LOS/NLOS status accurately. For example, as shown in FIG. 5, the testing/validation data is provided to the UE 610 (including positioning measurements from PRU 612, and reference positioning-related measurements). The positioning measurements (e.g., TDOA measurements and/or RSRP measurements measured by PRU 612) measured by PRU 612 are input at 508 to the UE ML model 510. UE ML model 510 performs position estimation (e.g., in this case, estimating position of PRU 612, based on positioning measurements (such as TDOA and/or RSRP measurements, in this example) provided by PRU 612), and outputs at 512 estimated positioning-related information (A'), e.g., which may include an estimated position of the PRU 612 and/or estimated LOS/NLOS status of the PRU 612. Block 514 (model testing/validation) of FIG. 5 may receive two inputs: 1) the reference positioning-related measurements, labels or ground truth(s) (A) provided (as part of testing/validation data at step 3), and 2) the estimated positioning-related information (A') output by the UE ML model 510. At block 514, UE 610 may perform ML model testing and/or validation, e.g., based on (A) the reference positioning-related measurements (e.g., ground truth or actual or true position of the PRU 612 or actual or true LOS/NLOS status of PRU 612), and (A') the estimated positioning-related information (e.g., estimated position of PRU 612 and/or estimated LOS/NLOS status of PRU 612) output by the ML model 510, and may output a ML model performance indication (such as a key performance indicator (KPI) or other performance indicator).

For example, at step 5 of FIG. 6, UE 610 or testing/validation block 514 of FIG. 5 may determine and/or output a ML model performance indication (e.g., such as a key performance indicator (KPI) of the ML model 510 indicating the accuracy or performance UE ML model 510) based on an error (e.g., mean square error (MSE)) or a difference (e.g., A-A') between the (A) the reference positioning-related measurements and the (A') estimated positioning-related measurements. Thus, the performance indication of the ML model, such as a KPI or other performance indication, may be based on the ML model output (e.g., estimated positioning-related information) and the ground truth (or labels or reference positioning-related information), for example.

At step 6 of FIG. 6, the UE 610 may report a performance indication or key performance indicator for the ML model 510 to LMF 614. If the UE is unable to determine or calculate a performance indication for the ML model (e.g., such as in a case where the UE does not have (or has not received) the ground truth or reference positioning-related information), then the UE may simply transmit or report to the LMF 614 or network node the ML model output, for example.

Note, that testing and/or validation of the UE ML model 510, e.g., including a comparison of, and/or determining an error (e.g., mean square error) or difference between, the reference positioning-related information (e.g., ground truth or labels) and estimated positioning-related information (ML model outputs) may be performed by either the UE 610 or a network node (e.g., gNB or LMF 614), e.g., depending on whether the reference positioning-related information or ground truth(s) (e.g., actual or true position of PRU 612 and/or actual or true LOS/NLOS status of PRU 612) is provided to UE 610 or not.

In one example, as noted above, in step 3 of FIG. 6, the validation/testing data provided by LMF 614 to UE 610 may include the reference positioning-related information or ground truth(s) and in such case, the UE 610 may perform its own testing and/or validation of the UE ML model used for positioning, and then may report a ML model performance indication or KPI to LMF 614 that indicates the error or difference between the reference positioning-related information and the estimated positioning-related information (and thus indicating ML performance or accuracy, with respect to the reference positioning-related information or ground truth).

However, in other cases, the LMF 614 or network node may not release or provide the reference positioning-related information (or ground truth(s) or labels) for PRU 612, e.g., as this information may be confidential. In this case, at step 3 of FIG. 6, the test/validation data would include positioning measurements from the PRU 612, but may not include reference positioning-related information or ground truth of PRU 612. Thus, in such case where LMF 614 or network node has the reference positioning-related information or ground truth (or labels) for the PRU 612 but the UE 510 does not have this reference or ground truth information, the UE 510 may report to the LMF 614 the output of the ML model 510 (e.g., the estimated positioning-related information, which may be or include estimated position and/or estimated LOS/NLOS status of PRU 612, for example), since the UE 610 is unable to calculate an error or difference between reference positioning-related information and estimated positioning-related information.

At step 7 of FIG. 6, the LMF 614 receives the information (e.g., performance indication or KPI) from UE 610. LMF 614 may perform one or more actions based on the performance indication or KPI for the ML model 510. If the information reported by the UE to LMF 614 is merely the output of the ML model (e.g., the estimated positioning-related information), then the LMF 614 or network node may determine a difference between the reference positioning-related information (or ground truth) of the PRU 612 (which may not be known by UE 610) and the estimated positioning-related information, which may indicate the performance or accuracy of the UE ML model for positioning. Alternatively, the received KPI at steps 6 and 7 from the UE 610 may include or indicate the difference between the reference positioning-related information (or ground truth) and estimated positioning-related information output by the ML model, or may provide other type of performance indication (e.g., such as a flag indicating whether or not the ML model is performing a required level or within required limits). For example, the LMF 614 may determine whether this difference is less than a threshold. If the difference (between ground truth and ML model output) is less than a threshold, this may indicate that the ML model is accurate or sufficiently accurate and no further action or ML model change is required at this point. On the other hand, if the difference (between ground truth or reference positioning-related information and the estimated positioning related information output by the ML model) is greater than a threshold, this may indicate that the ML model is not accurate or is not performing well (not performing at a required level), and one or more actions should be performed to address this deficiency or inaccuracy of the ML model 510.

At steps 7 and 8, based on the KPI (or performance indicator) (or the difference between the reference positioning related information and the estimated positioning-related information) or based on the ML model outputs, reported by UE 610 to LMF 614, the LMF 614 or network node may send a message (at step 8) to trigger or cause the UE 610 to perform one or more actions. Alternatively, the UE 610 may simply (e.g., with or without receiving a request or message at step 8 from LMF 614 or network node) perform one or more actions, based on the KPI or performance indication of the ML model or based on the difference between the reference positioning related information (ground truth for PRU 612) and the estimated positioning-related information (ML model output). For example, the UE 610 may perform, and/or the LMF 614 may send a message to the UE to cause the UE 610 to perform, one or more actions, such as one or more of: performing one or more changes or updates to the machine learning model; retraining the machine learning model; deactivating the machine learning model; selecting a different machine learning model; activating a different or new machine learning model, or replacing the machine learning model with a different machine learning model; using a positioning method that does not use a machine learning model (e.g., do not use the ML model for positioning if ML model is not accurate).

Embodiment 2: Sidelink for ML Model Validation

Considering the case where the testing and validation is performed at UE side, before initiating the testing/validation operation, the UE can request neighboring UEs through sidelink communication to share the performance of their ML model (e.g., a request to share their KPI, performance indication and/or difference or delta between their ground truth or reference positioning-related information and estimated positioning-related information) and corresponding used ML hyperparameters. Based on the received feedback from UEs via sidelink, the UE can either select the ML model with the lowest delta value (select the UE ML model with the lowest difference or delta value or the ML model with the highest accuracy or best performance) or decide on exploring other ML hyperparameters not yet tested by other UEs.

Embodiment 3: Provide Group of PRU Data for Validation

According to another example embodiment, a network node (e.g., LMF or other network node) may provide group of PRU data for validation. This way, network can determine the area where a model is good. For example, if network provides two validation data-sets A & B (each containing PRU data from specific areas), the UE may have two models 1 and 2. UE may, for example, provide validation against A & B sets for both models 1 and 2. So 4 reports in total may be determined and provided or available. Network node or LMF may determine that model 1 works better in area A, and model 2 works better in area B. Therefore, UE can be instructed to use a correct model (one of these models) immediately entering the area (e.g., send instruction to UE to use a particular model based on the area where the UE is located). The model validity area in question can be defined as a list of TRPs (transmission reception points or gNBs) and/or beam/cell identities (IDs) from where the measurements are collected, or a geographical area based on the hearability (detectability) of PRS transmissions from selected TRPs.

Embodiment 4: Group Based Validation

In an additional example embodiment, if the UEs are grouped in some specific ROI (region of interest), a network node may deploy a single specific model to all UEs within the given region. In such case, instead of validating a ML model for each UE in the same region of interest, the network node (e.g., LMF or gNB) may validate a single UE model and broadcast the output of the ML model validation for activation/deactivation of the specific ML model within the ROI. Grouping may be based on the distance from the given PRUs, the range between the UEs based on LMF estimated locations, or ranging between UEs over Sidelink.

Embodiment 5: Exposed ML UE Model

As noted above, in a situation where the UE vendors would like to expose (or disclose) the details of their deployed ML model, then the validation could be conducted at the network (e.g., LMF or gNB) side. In this case, the operation or procedure may be as follows:

UE send indication/request to the network (e.g., LMF) for its validation/testing of its ML model, such that the validation/testing of UE-specific ML model (e.g., UE ML model for positioning) may be performed at the network side (e.g., at LMF).

Alternatively, network node or LMF may proactively indicate validating/testing of UE ML model, such that the validation/testing to be conducted by the network or LMF. UE provides ML model details (e.g., neural weights, hyper-parameters, etc.) and required inputs of the ML model to the network node or LMF. For example, ML model details may be provided in the indication/request sent by the UE to the network or LMF. In another example, the ML model details may be provided in separate message(s). For example, if the network node or LMF requests validation/testing, the UE may provide the ML model details in the separate message(s). Network node or LMF may collect validation/testing data, for example based on the request/indication by the UE, performs validation/testing of the UE-provided ML model, and calculates KPI or performance indication that may indicate the model accuracy or performance. The network node may indicate ML model performance indication or KPI to UE and optionally determine and indicate one or more actions to be performed, e.g., model activation/deactivation/reselection/optimization to UE. For example, UE may be instructed or requested to select a different model or change one or more details of the ML model. In essence, the network, such as LMF, may have information on the ML model (i.e., ML model details), and thus the ML model may be tested/validated at the network side instead of testing/validating at the UE as in various examples herein. For example, the ML model details may comprise information such as model name, model type, model input parameter(s), model output(s), and/or information how the ML model works. That is, with the ML model details the network may operate the ML model in a similar manner as it is operated at the UE.

Likewise, as noted, in another example embodiment, the network node or LMF may not disclose grounds truths or reference positioning-related information, or other details of ML model, to the UE. In such case, the UE may report its ML model output(s) to network node or LMF, and the network node or LMF may calculate a performance indication or KPI based on delta or difference between ground truths (labels) or reference positioning-related information and estimated positioning-related information or ML model output.

Some further examples will be provided.

Example 1. A method may include: performing at least one of the following: receiving, by a first user device from a network node or a second user device, a request to test and/or validate a machine learning model for the first user device, wherein the machine learning model is to be used for positioning or to assist with positioning; or transmitting, by the first user device to the network node or the second user device, a request to validate the machine learning model; receiving, by the first user device from the network node or the second user device, 1) a positioning measurement report including at least one positioning measurement measured by a reference device based on reference signals, and 2) reference positioning-related information to be used for testing and/or validating the machine learning model; determining, by the first user device, estimated positioning-related information as outputs of the machine learning model based on at least a portion of the positioning measurement report as inputs to the machine learning model; determining, by the first user device, a performance indication of the machine learning model based on the reference positioning-related information and the estimated positioning-related information, wherein the performance indication indicates a performance or accuracy of the machine learning model; and performing, by the first user device, an action based on the performance indication.

Example 2. The method of Example 1, the performing an action based on the performance indication may include: making one or more changes to the machine learning model based on the performance indication.

Example 3. The method of Example 1, the performing an action based on the performance indication may include: transmitting, by the first user device to the network node or the second user device, the performance indication.

Example 4. The method of any of Examples 1-3, wherein the transmitting the performance indication may include at least one of the following: transmitting the performance indication if the performance indication is greater than a first threshold; or transmitting the performance indication if the performance indication is less than a second threshold.

Example 5. The method of any of Examples 1-4, wherein the reference positioning-related information comprises at least one of: a true or accurate line-of-sight/non-line-of-sight (LOS/NLOS) status of the reference device; a true or accurate position of the reference device; or a predicted output of the machine learning model, based on at least the portion of the positioning measurement report as inputs to the machine learning model, if the machine learning model is operating within a threshold level of accuracy.

Example 6. The method of any of Examples 1-5, wherein the estimated positioning-related information comprises at least one of: an estimated line-of-sight/non-line-of-sight (LOS/N LOS) status of the reference device, based on at least the portion of the positioning measurement report as inputs to the machine learning model; an estimated position of the reference device, based on at least the portion of the positioning measurement report as inputs to the machine learning model; an estimate of one or more measurements included within the positioning measurement report, e.g., such as an estimate of one or more of: time-of-arrival, time-difference-of-arrival, observed time-difference-of-arrival, or any other positioning measurement information the device reports to the network, based on at least the portion of the positioning measurement report as inputs to the machine learning model.

Example 7. The method of any of Examples 1-6, wherein the performance indication of the machine learning model is based on a comparison between the reference positioning-related information and the estimated positioning-related information.

Example 8. The method of any of Examples 1-7, wherein the performance indication of the machine learning model comprises, or is based upon, at least one of the following: a difference between the reference positioning-related information and the estimated positioning-related information; or an error estimation between the reference positioning-related information and the estimated positioning-related information.

Example 9. The method any of Examples 1-8, wherein the performing an action based on the performance indication comprises: transmitting, by the first user device to the network node or the second user device, the performance indication; wherein the method further comprises: receiving, by the first user device from the network node or the second user device, machine learning model change information based on the transmitted performance indication, to cause the first user device to perform one or more changes with respect to the machine learning model.

Example 10. The method of Example 9, wherein the machine learning model change information comprises one or more of the following: an indication that the machine learning model is inaccurate or does not meet a performance requirement; information to trigger a deactivation and/or a reselection of the machine learning model; a request to perform one or more changes or updates to the machine learning model; a request to re-train the machine learning model; a request to use a positioning method that does not use a machine learning model; or a request to replace the machine learning model with a different machine learning model.

Example 11. The method of any of Examples 9-10, wherein the one or more changes performed by the first user device with respect to the machine learning model comprises one or more of the following: perform one or more changes or updates to the machine learning model; retrain the machine learning model; deactivate the machine learning model; select a different machine learning model; activate a different or new machine learning model, or replace the machine learning model with a different machine learning model; use a positioning method that does not use a machine learning model.

Example 12. The method of Example 1, wherein the performing an action based on the performance indication comprises performing one or more of the following: performing one or more changes or updates to the machine learning model; retraining the machine learning model; deactivating the machine learning model; selecting a different machine learning model; activating a different or new machine learning model, or replacing the machine learning model with a different machine learning model; using a positioning method that does not use a machine learning model.

Example 13. The method of any of Examples 1-12, wherein the reference device comprises at least one of: a third user device that operates as a positioning reference unit (PRU); a third user device that is at a known location, has a known LOS/N LOS status, and/or has one or more known positioning measurements; or a device that is trusted by the network node or trusted by one or more entities of a wireless network.

Example 14. The method of any of Examples 1-13, wherein the network node comprises at least one of: a base station, eNB or gNB, or a location management function (LMF).

Example 15. The method of any of Examples 1-14, further comprising: transmitting, by the user device to the network node or second user device, information indicating one or more inputs of the machine learning model; wherein the received positioning measurement report is based on, or includes information that is based on, the information indicating one or more inputs of the machine learning model.

Example 16. An apparatus comprising means for performing the method of any of Examples 1-15.

Example 17. A non-transitory computer-readable storage medium comprising instructions stored thereon that, when executed by at least one processor, are configured to cause a computing system to perform the method of any of Examples 1-15.

Example 18. An apparatus comprising: at least one processor; and at least one memory including computer program code; the at least one memory and the computer program code configured to, with the at least one processor, cause the apparatus at least to perform the method of any of Examples 1-15.

Example 19. An apparatus comprising: at least one processor; and at least one memory including computer program code; the at least one memory and the computer program code configured to, with the at least one processor, cause the apparatus at least to: perform at least one of the following: receive, by a first user device from a network node or a second user device, a request to test and/or validate a machine learning model for the first user device, wherein the machine learning model is to be used for positioning or to assist with positioning; or transmit, by the first user device to the network node or the second user device, a request to validate the machine learning model; receive, by the first user device from the network node or the second user device, 1) a positioning measurement report including at least one positioning measurement measured by a reference device based on reference signals, and 2) reference positioning-related information to be used for testing and/or validating the machine learning model; determine, by the first user device, estimated positioning-related information as outputs of the machine learning model based on at least a portion of the positioning measurement report as inputs to the machine learning model; determine, by the first user device, a performance indication of the machine learning model based on the reference positioning-related information and the estimated positioning-related information, wherein the performance indication indicates a performance or accuracy of the machine learning model; and perform, by the first user device, an action based on the performance indication.

Example 20. A method comprising: performing at least one of the following by a network node or a second user device: transmitting, by a network node or a second user device to a first user device, a request to test and/or validate a machine learning model for the first user device, wherein the machine learning model is to be used for positioning or to assist with positioning; or receiving, by the network node or the second user device from the first user device, a request to validate the machine learning model; receiving by the network device or the second user device from a reference device, 1) a positioning measurement report including at least one positioning measurement measured by a reference device based on reference signals, and 2) reference positioning-related information to be used for testing and/or validating the machine learning model; transmitting, by the network node or the second user device to the first user device, the positioning measurement report; receiving, by the network node or the second user device from the first user device, estimated positioning-related information, which are outputs of the machine learning model of the first user device based on at least a portion of the positioning measurement report as inputs to the machine learning model of the first user device; determining, by the network node or the second user device, a performance indication of the machine learning model based on the reference positioning-related information and the estimated positioning-related information, wherein the performance indication indicates a performance or accuracy of the machine learning model; performing, by the network node or the second user device, an action based on the performance indication.

Example 21. The method of Example 20, wherein the performing an action comprises: determining machine learning model change information based on the performance indication; and transmitting, by the network node or second user device to the first user device, the machine learning model change information to cause the first user device to perform one or more changes with respect to the machine learning model.

Example 22. The method of Example 21, wherein the machine learning model change information comprises one or more of the following: an indication that the machine learning model is inaccurate or does not meet a performance requirement; information to trigger a deactivation and/or a reselection of the machine learning model; a request to perform one or more changes or updates to the machine learning model; a request to re-train the machine learning model; a request to use a positioning method that does not use a machine learning model; or a request to replace the machine learning model with a different machine learning model.

Example 23. The method of any of Examples 20-22, wherein the reference positioning-related information comprises at least one of: a true or accurate line-of-sight/non-line-of-sight (LOS/N LOS) status of the reference device; a true or accurate position of the reference device; or a predicted output of the machine learning model, based on at least the portion of the positioning measurement report as inputs to the machine learning model, if the machine learning model is operating within a threshold level of accuracy.

Example 24. The method of any of Examples 20-23, wherein the estimated positioning-related information comprises at least one of: an estimated line-of-sight/non-line-of-sight (LOS/N LOS) status of the reference device, based on at least the portion of the positioning measurement report as inputs to the machine learning model; an estimated position of the reference device, based on at least the portion of the positioning measurement report as inputs to the machine learning model.

Example 25. The method of any of Examples 20-24, wherein the performance indication of the machine learning model is based on a comparison between the reference positioning-related information and the estimated positioning-related information.

Example 26. The method of any of Examples 20-25, wherein the performance indication of the machine learning model comprises, or is based upon, at least one of the following: a difference between the reference positioning-related information and the estimated positioning-related information; or an error estimation between the reference positioning-related information and the estimated positioning-related information.

Example 27. An apparatus comprising means for performing the method of any of Examples 20-26.

Example 28. A non-transitory computer-readable storage medium comprising instructions stored thereon that, when executed by at least one processor, are configured to cause a computing system to perform the method of any of Examples 20-26.

Example 29. An apparatus comprising: at least one processor; and at least one memory including computer program code; the at least one memory and the computer program code configured to, with the at least one processor, cause the apparatus at least to perform the method of any of Examples 20-26.

Example 30. An apparatus comprising: at least one processor; and at least one memory including computer program code; the at least one memory and the computer program code configured to, with the at least one processor, cause the apparatus at least to: perform at least one of the following by a network node or a second user device: transmit, by a network node or a second user device to a first user device, a request to test and/or validate a machine learning model for the first user device, wherein the machine learning model is to be used for positioning or to assist with positioning; or receive, by the network node or the second user device from the first user device, a request to validate the machine learning model; receive by the network device or the second user device from a reference device, 1) a positioning measurement report including at least one positioning measurement measured by a reference device based on reference signals, and 2) reference positioning-related information to be used for testing and/or validating the machine learning model; transmit, by the network node or the second user device to the first user device, the positioning measurement report; receive, by the network node or the second user device from the first user device, estimated positioning-related information, which are outputs of the machine learning model of the first user device based on at least a portion of the positioning measurement report as inputs to the machine learning model of the first user device; determine, by the network node or the second user device, a performance indication of the machine learning model based on the reference positioning-related information and the estimated positioning-related information, wherein the performance indication indicates a performance or accuracy of the machine learning model; perform, by the network node or the second user device, an action based on the performance indication.

Figure 7:
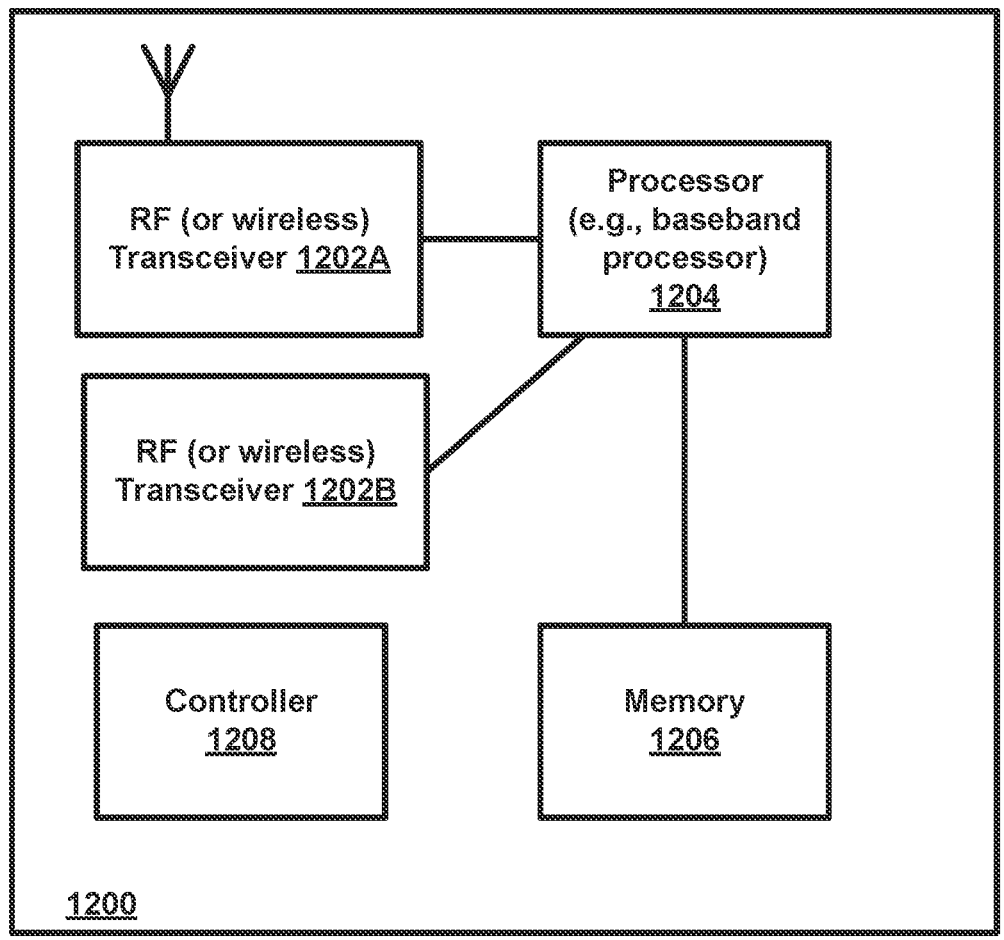
FIG. 7 is a block diagram of a wireless station or wireless node (e.g., network node, user node or UE, relay node, or other node).

FIG. 7 is a block diagram of a wireless station or node (e.g., UE, user device, AP, BS, eNB, gNB, RAN node, network node, TRP, or other node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
performing at least one of the following:
receiving, by a first user device from a network node or a second user device, a request to test and/or validate a machine learning model for the first user device, wherein the machine learning model is to be used for positioning or to assist with positioning; or
transmitting, by the first user device to the network node or the second user device, a request to validate the machine learning model;
receiving, by the first user device from the network node or the second user device, 1) a positioning measurement report including at least one positioning measurement measured by a reference device based on reference signals, and 2) reference positioning-related information to be used for testing and/or validating the machine learning model;
determining, by the first user device, estimated positioning-related information as outputs of the machine learning model based on at least a portion of the positioning measurement report as inputs to the machine learning model;
determining, by the first user device, a performance indication of the machine learning model based on the reference positioning-related information and the estimated positioning-related information, wherein the performance indication indicates a performance or accuracy of the machine learning model; and
performing, by the first user device, an action based on the performance indication.

2. A first user device comprising:
at least one processor; and
at least one memory including computer program code;
the at least one memory and the computer program code configured to, with the at least one processor, cause the first user device at least to:
perform at least one of the following:
receive, by the first user device from a network node or a second user device, a request to test and/or validate a machine learning model for the first user device, wherein the machine learning model is to be used for positioning or to assist with positioning; or
transmit, by the first user device to the network node or the second user device, a request to validate the machine learning model;
receive, by the first user device from the network node or the second user device, 1) a positioning measurement report including at least one positioning measurement measured by a reference device based on reference signals, and 2) reference positioning-related information to be used for testing and/or validating the machine learning model;
determine, by the first user device, estimated positioning-related information as outputs of the machine learning model based on at least a portion of the positioning measurement report as inputs to the machine learning model;
determine, by the first user device, a performance indication of the machine learning model based on the reference positioning-related information and the estimated positioning-related information, wherein the performance indication indicates a performance or accuracy of the machine learning model; and
perform, by the first user device, an action based on the performance indication.

3. The first user device of claim 2, wherein the performing an action based on the performance indication comprises:
making one or more changes to the machine learning model based on the performance indication.

4. The first user device of claim 2, wherein the performing an action based on the performance indication comprises:
transmitting, by the first user device to the network node or the second user device, the performance indication.

5. The first user device of claim 4, wherein the transmitting the performance indication comprises at least one of the following:
transmitting the performance indication if the performance indication is greater than a first threshold; or
transmitting the performance indication if the performance indication is less than a second threshold.

6. The first user device of claim 2, wherein the reference positioning-related information comprises at least one of:
a true or accurate line-of-sight/non-line-of-sight (LOS/NLOS) status of the reference device;
a true or accurate position of the reference device; or
a predicted output of the machine learning model, based on at least the portion of the positioning measurement report as inputs to the machine learning model, if the machine learning model is operating within a threshold level of accuracy.

7. The first user device of claim 2, wherein the estimated positioning-related information comprises at least one of:
an estimated line-of-sight/non-line-of-sight (LOS/NLOS) status of the reference device, based on at least the portion of the positioning measurement report as inputs to the machine learning model;
an estimated position of the reference device, based on at least the portion of the positioning measurement report as inputs to the machine learning model; or
an estimate of one or more measurements included within the positioning measurement report based on at least the portion of the positioning measurement report as inputs to the machine learning model.

8. The first user device of claim 2, wherein the performance indication of the machine learning model is based on a comparison between the reference positioning-related information and the estimated positioning-related information.

9. The first user device of claim 2, wherein the performance indication of the machine learning model comprises, or is based upon, at least one of the following:
a difference between the reference positioning-related information and the estimated positioning-related information; or
an error estimation between the reference positioning-related information and the estimated positioning-related information.

10. The first user device claim 2, wherein the performing an action based on the performance indication comprises:
transmitting, by the first user device to the network node or the second user device, the performance indication;
wherein the first user device is caused to:
receiving, by the first user device from the network node or the second user device, machine learning model change information based on the transmitted performance indication, to cause the first user device to perform one or more changes with respect to the machine learning model.

11. The first user device of claim 10, wherein the machine learning model change information comprises one or more of the following:
  an indication that the machine learning model is inaccurate or does not meet a performance requirement;
  information to trigger a deactivation and/or a reselection of the machine learning model;
  a request to perform one or more changes or updates to the machine learning model;
  a request to re-train the machine learning model;
  a request to use a positioning method that does not use a machine learning model; or
  a request to replace the machine learning model with a different machine learning model.

12. The first user device of claim 10, wherein the one or more changes performed by the first user device with respect to the machine learning model comprises one or more of the following:
  perform one or more changes or updates to the machine learning model;
  retrain the machine learning model;
  deactivate the machine learning model;
  select a different machine learning model;
  activate a different or new machine learning model, or replace the machine learning model with a different machine learning model;
  use a positioning method that does not use a machine learning model.

13. The first user device of claim 2, wherein the performing an action based on the performance indication comprises performing one or more of the following:
  performing one or more changes or updates to the machine learning model;
  retraining the machine learning model;
  deactivating the machine learning model;
  selecting a different machine learning model;
  activating a different or new machine learning model, or replacing the machine learning model with a different machine learning model;
  using a positioning method that does not use a machine learning model.

14. The first user device of claim 2, wherein the reference device comprises at least one of:
  a third user device that operates as a positioning reference unit (PRU);
  a third user device that is at a known location, has a known LOS/NLOS status, and/or has one or more known positioning measurements; or
  a device that is trusted by the network node or trusted by one or more entities of a wireless network.

15. The first user device of claim 2, wherein the network node comprises at least one of:
  a base station, eNB or gNB; or
  a location management function (LMF).

16. The first user device of claim 2, caused to:
  transmitting, by the first user device to the network node or second user device, information indicating one or more inputs of the machine learning model;
  wherein the received positioning measurement report is based on, or includes information that is based on, the information indicating one or more inputs of the machine learning model.

17. An apparatus comprising:
  at least one processor; and
  at least one memory including computer program code;
  the at least one memory and the computer program code configured to, with the at least one processor, cause the apparatus at least to:
  perform at least one of the following by a network node or a second user device:
    transmit, by a network node or a second user device to a first user device, a request to test and/or validate a machine learning model for the first user device, wherein the machine learning model is to be used for positioning or to assist with positioning; or
  receive, by the network node or the second user device from the first user device, a request to validate the machine learning model;
  receive by the network device or the second user device from a reference device, 1) a positioning measurement report including at least one positioning measurement measured by a reference device based on reference signals, and 2) reference positioning-related information to be used for testing and/or validating the machine learning model;
  transmit, by the network node or the second user device to the first user device, the positioning measurement report;
  receive, by the network node or the second user device from the first user device, estimated positioning-related information, which are outputs of the machine learning model of the first user device based on at least a portion of the positioning measurement report as inputs to the machine learning model of the first user device;
  determine, by the network node or the second user device, a performance indication of the machine learning model based on the reference positioning-related information and the estimated positioning-related information, wherein the performance indication indicates a performance or accuracy of the machine learning model;
  perform, by the network node or the second user device, an action based on the performance indication.

18. The apparatus of claim 17, wherein the performing an action comprises:
  determining machine learning model change information based on the performance indication; and
  transmitting, by the network node or second user device to the first user device, the machine learning model change information to cause the first user device to perform one or more changes with respect to the machine learning model.

19. The apparatus of claim 18, wherein the machine learning model change information comprises one or more of the following:
  an indication that the machine learning model is inaccurate or does not meet a performance requirement;
  information to trigger a deactivation and/or a reselection of the machine learning model;
  a request to perform one or more changes or updates to the machine learning model;
  a request to re-train the machine learning model;
  a request to use a positioning method that does not use a machine learning model; or
  a request to replace the machine learning model with a different machine learning model.

20. The apparatus of claim 17, wherein the reference positioning-related information comprises at least one of:
  a true or accurate line-of-sight/non-line-of-sight (LOS/NLOS) status of the reference device;

a true or accurate position of the reference device; or a predicted output of the machine learning model, based on at least the portion of the positioning measurement report as inputs to the machine learning model, if the machine learning model is operating within a threshold level of accuracy.

\* \* \* \* \*